United States Patent [19]

Mallya et al.

[11] Patent Number: 4,812,541

[45] Date of Patent: Mar. 14, 1989

[54] HIGH PERFORMANCE PRESSURE-SENSITIVE ADHESIVE POLYMERS

[75] Inventors: Prakash Mallya, Pasadena; Colin Smith, Glendale; Sebastian S. Plamthottam, Pasadena, all of Calif.

[73] Assignee: Avery International Corporation, Pasadena, Calif.

[21] Appl. No.: 138,722

[22] Filed: Dec. 23, 1987

[51] Int. Cl.$^4$ .............................................. C08F 26/08
[52] U.S. Cl. ...................................... 526/264; 526/273
[58] Field of Search ................................ 526/264, 273

[56] References Cited

U.S. PATENT DOCUMENTS 3,787,380 1/1974 Stamberger ........................ 526/264
4,510,197 4/1985 Shah .................................. 526/264

*Primary Examiner*—Paul R. Michl
*Assistant Examiner*—Alex H. Walker
*Attorney, Agent, or Firm*—Christie, Parker & Hale

[57] ABSTRACT

Pressure-sensitive copolymers based on acrylic monomers are provided with high adhesive performance characteristics by the inclusion of a synergistic amount of an N-vinyl lactam monomer and a glycidyl monomer with the bulk of the monomers being an alkyl acrylate and/or methacrylate esters.

19 Claims, 1 Drawing Sheet

HIGH PERFORMANCE PRESSURE-SENSITIVE ADHESIVE POLYMERS

BACKGROUND OF THE INVENTION

The present invention is directed to pressure-sensitive adhesive compositions that exhibit high adhesion to high energy surfaces such as aluminum and possess high tack and outstanding holding power at elevated temperatures. Two key monomers are used in combination in the pressure-sensitive adhesives of this invention to impart unique properties to the resulting polymers. The monomers are at least one glycidyl monomer in combination with at least one N-vinyl lactam.

The use of glycidyl monomers in pressure-sensitive adhesive has been disclosed in the art.

U.S. Pat. No. 3,284,423 discloses creep-resistant pressure-sensitive adhesive compositions comprising 35-75% by weight alkyl acrylate esters containing 6-15 carbon atoms, 10-60% lower alkyl acrylate, 0.1-10% by weight of an ethylenically unsaturated carboxylic acid and 0.1-10% by weight glycidyl ester.

U.S. Pat. No. 3,893,982 discloses an interpolymer comprising 0.1-15% parts of an ethylenically unsaturated carboxylic acid, 0.1-2% parts of a glycidyl monomer, 35-84.9% parts of an alkyl acrylate or methacrylate and optionally a monomer selected from the group consisting of alpha-olefins containing 2-10 carbon atoms, vinyl esters of alkanoic acids containing 3-10 carbon atoms, ethyl and methyl esters of acrylic and methacrylic acids, acrylonitrile, methacrylonitrile, styrene and vinyl chloride where the polymer has a weight average molecular weight in the range of 10,000-500,000 and between 0.01 and 1 parts by weight per 100 parts of the copolymer of 1,3-bis(dimethylamino)-2-hydroxypropane to cause the cure of the epoxy group.

The art has also taught the use of N-vinyl lactams in polymers.

U.S. Pat. No. 3,728,148 discloses a pressure-sensitive adhesive for electrical insulating applications comprising of a copolymer of 65-90% by weight of an alkyl acrylate ester, 10-30 by weight of a N-vinyl lactam and 0-20% by weight of a modifying monomer which is copolymerizable with the above. Acidic monomers and amides are excluded as they are claimed to cause undesirable corrosion.

U.S. Pat. No. 4,181,752 discloses an interpolymer containing 87% by weight isooctyl acrylate, 8% by weight vinyl pyrrolidone, 3% by weight acrylic acid and 2% by weight acrylamide.

U.S. Pat. No. 4,364,972 discloses a pressure-sensitive adhesive tape made by copolymerizing an alkyl acrylate ester with 15 to 50 parts by weight of vinyl pyrrolidone and having a K-value greater than 100 and when crosslinked has a gel-swell in ethyl acetate in excess of 600%. Advantages claimed are good adhesion to automotive paints, rubber and plastic foam layers.

U.S. Pat. No. 4,310,509 discloses a 90/10 2-ethyl hexyl acrylate/vinyl pyrrolidone copolymer for making a pressure sensitive adherent for complexing with iodine for anti-microbial activity.

European Patent Application No. 130080 discloses an emulsion polymerized pressure-sensitive adhesive comprising 2-20% by weight N-vinyl lactam and an alkyl acrylate ester. The claimed use is good adhesion to skin under hot and humid conditions.

U.S. Pat. No. 4,370,380 is directed to a blend of two polymers. One is a copolymer of 88-99% by weight of an alkyl acrylate ester with 1-12% by weight of a carboxylic acid with a glass transition temperature (Tg) of less than 0° C. The second polymer is either a homo or a copolymer of N-vinyl lactam with a Tg of 20°-150° C. The blend ratio is 70-99% by weight of the first polymer with 1-30% by weight of the second polymer. The resultant pressure-sensitive adhesive is disclosed to have moisture permeability.

U.S. Pat. No. 4,150,197 discloses a water vapor permeable pressure-sensitive adhesive comprising a copolymer of 79-89% of butyl acrylate, 10-20% by weight of N-vinyl lactam and 1-5% by weight of an acidic comonomer.

None of the patents or applications discloses a copolymer containing both a glycidyl monomer and N-vinyl lactam monomer.

SUMMARY OF THE INVENTION

It has now been found that, as part of an acrylic and/or methacrylic ester based polymer system, a glycidyl monomer and a N-vinyl lactam monomer synergistically act to provide unusually high adhesion to high energy surfaces such as aluminum and stainless steel. The pressure-sensitive adhesives of the invention are formed of copolymers containing essentially no crosslinking when polymerized and which contain on a copolymerized basis from about 0.1 to about 2% by weight of glycidyl monomer, about 1% to about 20% by weight, preferably from about 1 to about 10% by weight of an N-vinyl lactam monomer, from 0 to about 15% by weight of an ethylenically unsaturated carboxylic acid, from about 55 to about 85% by weight an alkyl acrylate or methacrylate ester containing from 4 to about 12 carbon atoms in the alkyl group, from 0 to 35% by weight of an alkyl acrylate or methacrylate ester containing less than 4 carbon atoms in the alkyl group, and optionally, one or more other monomers employed to tailor polymer properties, such as glass transition temperature, to end use applications.

Such monomers include polystyryl ethyl methacrylate, acetoacetoxy ethyl methacrylate, styrene, alpha olefins, and vinyl esters of alkanoic acids containing greater than 3 carbon atoms and mixtures thereof. Modifying monomer content can range from 0 to about 35% by weight of the total monomers.

The ratio of monomers is selected to provide a copolymer with glass transition temperature of less than about −15° C. and a weight average molecular weight of at least about 200,000, preferably from about 200,000 to about 500,000 as determined by size exclusion chromatography using polystyrene for calibration. Polymers of the instant invention may be synthesized by solution, emulsion and bulk polymerization. It is presently preferred that they be formed by solution polymerization. Polymers are cross-linked to the desired extent, prior to use, using heat, ionic additives, actinic or electron beam radiation and the like.

The novel polymers on cross-linking exhibit excellent adhesion to high energy surfaces such as aluminum as evidenced by increased peel adhesion with dwell and superior rivet performance as evidenced by reduced tenting as described herein.

THE DRAWINGS:

FIG. 1 graphically compares 180° peel adhesion on alodine aluminum panels of two adhesives, one which contains both a glycidyl monomer and a lactam monomer to one containing only a glycidyl monomer.

FIG. 2 compares 180° peel on stainless steel as a function of dwell at two temperature conditions, room temperature and 120° C. for compositions of the invention to controls.

The room temperature dwell was for 20 minutes and 120° C. dwell was for 30 minutes. After dwelling for 30 minutes at 120° C., the adhesive on the substrate was allowed to equilibrate to room temperature and 180° peel determined.

DETAILED DESCRIPTION

Figure 1:
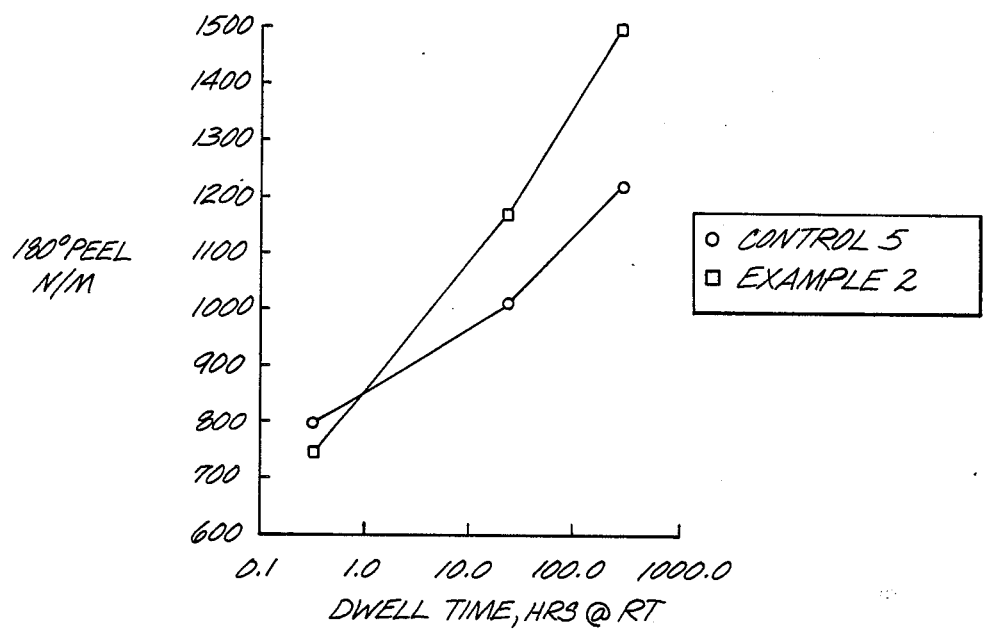

Pressure-sensitive adhesive polymers of the instant invention are prepared by copolymerizing a mixture of monomers comprising from about 55 to about 85% by weight of an alkyl acrylate and/or methacrylate ester containing 4 to about 12 carbon atoms in the alkyl group; from about 0.01 to about 2% by weight of a glycidyl monomer; from about 1 to about 20% by weight, preferably from 1 to about 10% by weight of an N-vinyl lactam monomer; from 0 to 15% by weight, preferably from about 5 to about 13% by weight of an unsaturated carboxylic acid; from 0 to about 35% by weight of an alkyl acrylate and/or methacrylate ester containing less than 4 carbon atoms in the alkyl group and optionally from about 0 to 33% by weight of one or more other comonomers to provide a balance of desirable polymer properties such as glass transition temperature. The precise ratio of the monomers is selected to give a polymer whose glass transition temperature is lower than about −15° C. The polymers of the instant invention have a weight average molecular weight of at least about 200,000, preferably from about 200,000 to about 500,000 as determined by size exclusion chromatography using polystyrene as the calibrator.

The alkyl acrylate and methacrylate esters containing 4 to about 12 carbon atoms in the alkyl group useful in forming the polymers of the instant invention include without limitation 2-ethyl hexyl acrylate, isooctyl acrylate, butyl acrylate, sec-butyl acrylate, methyl butyl acrylate, 4-methyl-2-pentyl acrylate, isodecyl methacrylate and the like and mixtures thereof. Isooctyl acrylate and 2-ethyl hexyl acrylate are presently preferred.

The glycidyl monomers are glycidyl acrylate, glycidyl methacrylate, allyl glycidyl ether and mixtures thereof. The presently preferred gylcidyl monomer is glycidyl methacrylate.

The N-vinyl lactams monomers which may be used include N-vinyl pyrrolidone, N-vinyl caprolactam, 1-vinyl-2-piperidone, 1-vinyl-5-methyl-2-pyrrolidone, and the like, N-vinyl pyrrolidone is presently preferred.

Ethylenically unsaturated carboxylic acids include acrylic acid, methacrylic acid, fumaric acid, and the like.

Alkyl acrylate and methacrylate esters containing less than 4 carbon atoms in the alkyl group include methyl acrylate, ethyl acrylate, methyl methacrylate and the like. Methyl acrylate is presently preferred.

Other monomers which can be included are polystyryl ethyl methacrylate, acetoacetoxy ethyl methacrylate, alpha olefins such as ethylene and propylene and vinyl esters of alkanoic acids containing more than three carbon atoms as well as mixtures thereof. Such monomer concentrations are in the range from 0 to about 35 percent by weight of the total monomers.

The copolymers may be synthesized using solution emulsion, and batch polymerization techniques. It is presently preferred to prepare the copolymers in solution using a mixture of solvents. The present preferred solution polymerization involves the use of blends of ethyl acetate and hexane or ethyl acetate and acetone. The ratio of solvents are adjusted to provide a reflux temperature of from about 68° C. to about 78° C. Solids content during polymerization may typically range from about 40% to about 60% in order to achieve the desired weight average molecular weight, and yet achieve viscosities that are manageable in the reactor. Reaction occurs in the presence of free-radical initiators, preferably of the azo type, for example, 2,2′-azobis (isobutyronitrile). The polymers formed are solvent soluble polymers with essentially no crosslinking. To this end, the glycidyl monomer is preferably limited to 2% by weight of the total monomers to avoid the possibility of cross-linking, by opening of the oxirane group, during polymerization or during aging. Polymers can, as desired, be post-polymerization cross-linked using heat, actinic or electron beam radiation and the like.

The unique characteristics of the cross-linked pressure-sensitive adhesive copolymers of the instant invention is a dramatic adhesion to high energy surfaces, such to aluminum and stainless steel, as seen by increased peel adhesion values with dwell times and superior rivet performance, as reflected by reduced tenting. Superior performance requires the presence of both glycidyl and lactam monomers. In the absence of one, poor adhesion to aluminum has been observed, as manifested by poor tenting performance (see Table I). These results are unexpected as a primary purpose in incorporating the N-vinyl lactam is to increase adhesion to vinyl films and painted surfaces. The purpose of the glycidyl group is normally to introduce a latent functional group which could undergo cross-linking at elevated temperatures under use conditions. This was realized by the dramatic improvement in elevated temperature performance even as high as 200° C. and high levels of shear adhesion failure temperature (SAFT) of polymers containing glycidyl methacrylate as established by Table II. Improved peel adhesion was totally unexpected. While not bound by theory, it is presently believed that chemical reaction occurs between the epoxy groups and functional groups such as hydroxyl groups on the substrate or a complexation reaction occurs between the epoxy groups and the nitrogen of the lactam, with ionic groups such as Al+++ on the substrate leading to increased bond strength.

An application of the adhesives of the instant invention is the marking of truck panels and the like with an adhesive coated vinyl film. The film is applied over a panel which may be a painted or unpainted aluminum panel fixed with aluminum rivets. The ability of the adhesive to conform to the contour of the rivet and not lift appreciably after application is highly desirable. A tendency to lift away is known as "tenting" and the greater the separation from the rivet the more unsatisfactory is the adhesive.

The SAFT test is a test where the adhesive is applied to 0.5″ × 1″ overlap on stainless steel to which a 4.5 lb. roll force applied. After dwell of 24 hours, this is placed in an oven and a kilogram load is applied under shear conditions and temperature raised from 40° C. to 200° C. at the rate of 1° C. per minute. The failure temperature is recorded as the shear adhesion failure temperature. This is a measure of the cohesive strength of the adhesive or the ability of the adhesive to maintain a bond at elevated temperatures.

While not limiting, the following illustrate the invention.

EXAMPLE 1

A monomer mixture was made up by mixing 423 g. of 2-ethyl hexyl acrylate, 145 g of methyl acrylate, 3.15 g. of glycidyl methacrylate, 12.6 g of N-vinyl pyrrolidone and 44.1 g of acrylic acid. 157 g. of this mixture was introduced to a 2 liter reactor equipped with a pitched turbine agitator, a reflux condensor and a thermistor. Also added were 73.5 g. of ethyl acetate and 78.76 g of hexane. The contents of the reactor were heated to reflux and 0.238 g of Vazo 64, manufactured and sold by duPont in 5.0 g of ethyl acetate was added. Vigorous reflux started in a short time and the contents of the reactor were held for 23 minutes. At this time, the remaining monomers were mixed with 537.2 g. of ethyl acetate, 75.2 g. of hexane and 0.707 g. of Vazo 64 and added as a single feed mixture over 3.5 hrs. All through the feed, temperature was maintained to keep reactor contents under reflux. One hour after end of feed, 0.17 g. Vazo 64 was added in 5 g. ethyl acetate and held for an additional hour. The percentage of solids content at the end of reaction was 46.4% and the viscosity was 23 Pa.s using #4@12 on a Brookfield viscometer.

EXAMPLE 2

A monomer mixture was made up by mixing 453.6 g. of Isooctyl acrylate, 100.8 g of methyl acrylate, 6.3 g. of glycidyl methacrylate, 25.2 g of N-vinyl caprolactam, 44.1 g of acrylic acid and 0.945 g of Vazo 64. 157.5 g of this mixture was introduced to the reactor with 78.76 g of hexane, 78.76 g of ethyl acetate and heated to reflex. Once vigorous reflux initiated, the contents were held for about 12 minutes and the remaining monomers added along with 537.24 g of ethyl acetate and 75.24 g of hexane as a single feed over 3 hours. Two hours after the end of feed, the contents were cooled.

EXAMPLE 3

Tenting Test

There was formed as control 1 a polymer containing 65.7% by weight 2-ethyl hexyl acrylate, 27.3% by weight methyl acrylate and 7% by weight acrylic acid. As Control 2, there was formed a polymer containing 67% by weight 2-ethyl hexyl acrylate, 24% by weight methyl acrylate, 7% acrylic acid, and 2% by weight N-vinyl pyrrolidone. As Control 3, there was formed a polymer containing 65.7% by weight 2-ethyl hexyl acrylate, 27.2% by weight methyl acrylate, 7% by weight acrylic acid and 0.1% by weight glycidyl methacrylate. As Control 4, there was used a polymer containing 65% by weight 2-ethyl hexyl acrylate, 27% by weight methyl acrylate, 7% by weight acrylic acid and 1% by weight glycidyl methacrylate. These were compared for tenting in a rivet test to the polymers of Examples 1 and 2. As a cross-linker in each instance, there was added 0.2 parts by weight of the polymer of aluminum acetyl acetonate. For the rivet tenting test adhesive was transfer coated from a release liner to a cast vinyl facestock, at a coat weight of 30 g/m². The results are given in Table 1, wherein the lower the value reported, the less tenting, i.e., lifting away from the rivet, occurred.

Table 2 compares the polymer of Example 1 electron-beam (EB) cured at a dosage of 30 kiloGray (kGy) and the polymer of Example 2 also EB cured at a dosage of 30 kGy. Examples 1 and 2 exhibited the best combinations of shear and tack.

TABLE 1

| Control/Example* | Tenting in Rivet Test, mm |
| --- | --- |
| Control 1 | 1.42 |
| Control 2 | 1.32 |
| Control 3 | 1.37 |
| Control 4 | 1.25 |
| Example 1 | 0.58 |
| Example 2 | 1.1 |

*All the polymers were cross-linked with 0.2 parts per hundred parts of the polymer of Aluminum acetyl acetonate.

TABLE 2

|  | Example 1 EB, 30 kGy | Example 2 EB, 30 kGy |
| --- | --- | --- |
| 180° Peel, NM |  |  |
| Stainless Steel, 20' Dwell | 572 | 632 |
| Hard PVC | 692 | 780 |
| Static Shear, min. |  |  |
| 20° C./1 kg | 10000+ | 9577 |
| 150° C./1 kg | 5200+ | 5200+ |
| 200° C./1 kg | 3300+ | 3300+ |
| Loop Tack, N/M | 600 | 270 |
| SAFT, °C. | 200°+ | 200°+ |

RT Shear, 0.5 × 0.5 inch overlap, Al Facestock SAFT and ET Shear, 0.5 × 1.0 inch overlap, Al Facestock For SAFT, 24 hr. dwell, rate of heating 1° C./minute

CONTROL 5 to 8 and EXAMPLES 4 and 5

There was compared to the product of Example 2 a copolymer containing 67 parts by weight isooctyl acrylate, 25 parts by weight methyl acrylate, 1 part by weight glycidyl methacrylate, and 7 parts by weight acrylic acid (Control 5). Control 5 and Example 2 copolymers were coated to a level of 50 g/m² onto mylar and cured at an electron beam level of 30 kGy. A comparison of 180° peel on alodine aluminum substrate in Newtons/meter (N/M) as a function of dwell time is shown in FIG. 1 and establishes that the combination of glycidyl methacrylate and vinyl caprolactam produce unusually high 180° peels, especially after extended dwell times.

Figure 2:
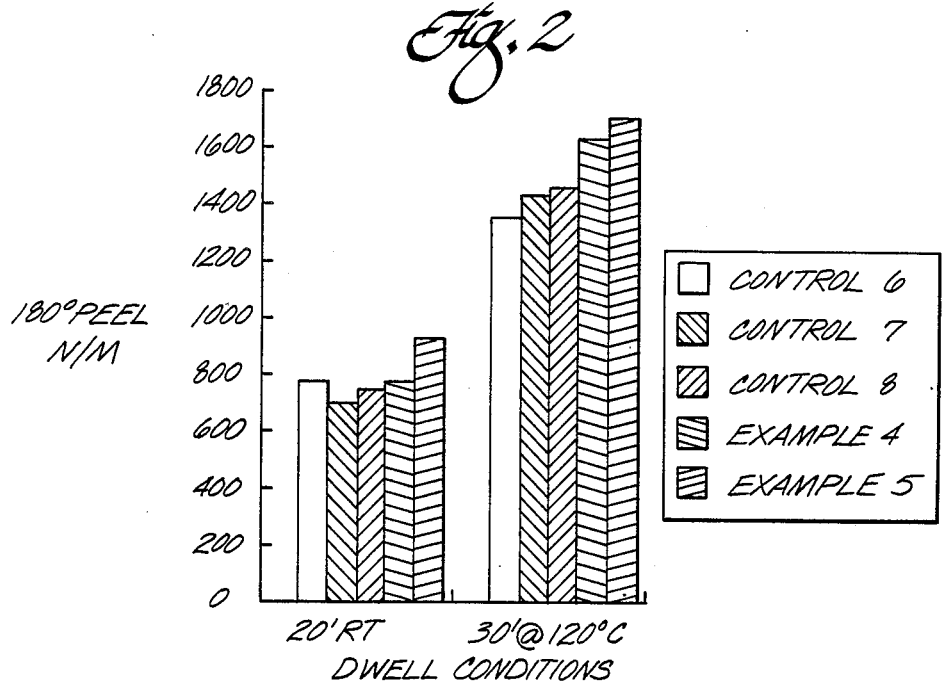

FIG. 2 compares 180° peel on stainless steel substrate as a function of dwell at room temperature for 20 minutes and dwell at 120° C. for 30 minutes followed by peel testing at room temperature. All polymers employed contained 2-ethyl hexyl acrylate, methyl acrylate and acrylic acid. Control 6 contained no glycidyl methacrylate or N-vinyl lactam. Control 7 contained 0.1 part glycidyl methacrylate but no N-vinyl lactam. Control 8 contained 1 part by weight glycidyl methacrylate but no N-vinyl lactam. Example 4 contained 0.1 part by weight glycidyl methacrylate and 2 parts by weight N-vinyl pyrrolidone. Example 5 contained 0.1 part by weight glycidyl methacrylate and 4 parts by weight N-vinyl caprolactam per hundred parts total monomer. In each instance, the polymers were EB cured at a dosage of 30 kGy. The glycidyl methacrylate in combination and N-vinyl lactam gives better performance in terms of adhesion to high energy surfaces than the individual constituents of the combination.

What is claimed is:

1. A pressure-sensitive adhesive comprising a copolymer comprising on a copolymerized basis from about 55 to about 85% by weight of a monomer selected from the group consisting of alkyl acrylate esters and alkyl methacrylate esters containing from 4 to about 12 carbon atoms in the alkyl group and mixtures thereof, from 0 to about 35% by weight of an alkyl acrylate or methacrylate ester containing less than 4 carbon atoms in the alkyl group, from 0.01 to about 2% by weight of a glycidyl monomer, from about 1 to about 10% by weight of an N-vinyl lactam, and from 0 to about 15% by weight of an unsaturated carboxylic acid, said copolymer having a weight average molecular weight of at least about 200,000 and a glass transition temperature less than about −15° C.

2. A pressure-sensitive adhesive as claimed in claim 1 which contains, based on the total weight of monomers, up to about 35% by weight, of a monomer selected from the group consisting of polystyryl ethyl methacrylate, aceto-acetoxy ethyl methacrylate, styrene, alpha olefins, vinyl esters of alkanoic acids containing more than about three carbon atoms and mixtures thereof.

3. A pressure-sensitive adhesive as claimed in claim 1 in which the alkyl acrylate is 2-ethyl hexyl acrylate or isooctyl acrylate.

4. A pressure-sensitive adhesive as claimed in claim 2 in which the alkyl acrylate is 2-ethyl hexyl acrylate or isooctyl acrylate.

5. A pressure-sensitive adhesive as claimed in claim 1 in which the glycidyl monomer is selected from the group consisting of glycidyl acrylate, glycidyl methacrylate, allyl glycidyl ether and mixtures thereof.

6. A pressure-sensitive adhesive as claimed in claim 2 in which the glycidyl monomer is selected from the group consisting of glycidyl acrylate, glycidyl methacrylate, allyl glycidyl ether and mixtures thereof.

7. A pressure-sensitive adhesive as claimed in claim 3 in which the glycidyl monomer is selected from the group consisting of glycidyl acrylate, glycidyl methacrylate, allyl glycidyl ether and mixtures thereof.

8. A pressure-sensitive adhesive as claimed in claim 4 in which the glycidyl monomer is selected from the group consisting of glycidyl acrylate, glycidyl methacrylate, allyl glycidyl ether and mixtures thereof.

9. A pressure-sensitive adhesive as claimed in claim 1 in which the N-vinyl lactam is selected from the group consisting of N-vinyl pyrrolidone, N-vinyl caprolactam and mixtures thereof.

10. A pressure-sensitive adhesive as claimed in claim 2 in which the N-vinyl lactam is selected from the group consisting of N-vinyl pyrrolidone, N-vinyl caprolactam and mixtures thereof.

11. A pressure-sensitive adhesive as claimed in claim 3 in which the N-vinyl lactam is selected from the group consisting of N-vinyl pyrrolidone, N-vinyl caprolactam and mixtures thereof.

12. A pressure-sensitive adhesive as claimed in claim 4 in which the N-vinyl lactam is selected from the group consisting of N-vinyl pyrrolidone, N-vinyl caprolactam and mixtures thereof.

13. A pressure-sensitive adhesive as claimed in claim 5 in which the N-vinyl lactam is selected from the group consisting of N-vinyl pyrrolidone, N-vinyl caprolactam and mixtures thereof.

14. A pressure-sensitive adhesive as claimed in claim 6 in which the N-vinyl lactam is selected from the group consisting of N-vinyl pyrrolidone, N-vinyl caprolactam and mixtures thereof.

15. A pressure-sensitive adhesive as claimed in claim 7 in which the N-vinyl lactam is selected from the group consisting of N-vinyl pyrrolidone, N-vinyl caprolactam and mixtures thereof.

16. A pressure-sensitive adhesive as claimed in claim 8 in which the N-vinyl lactam is selected from the group consisting of N-vinyl pyrrolidone, N-vinyl caprolactam and mixtures thereof.

17. A pressure-sensitive adhesive as claimed in claim 1 in which the formed copolymer is cross-linked by exposure to heat, ionic additive, actinic radiation or electron beam radiation.

18. A pressure-sensitive adhesive comprising a copolymer comprising frm about 55 to about 85% of an alkyl acrylate ester selected from the group consisting of isooctyl acrylate and 2-ethyl hexyl acrylate, from about 0.01 to about 2% by weight glycidyl methacrylate, from about 1 to about 10% of a N-vinyl lactam selected from the group consisting of N-vinyl pyrrolidone and N-vinyl caprolactam, from about 5 to 13% by weight unsaturated carboxylic acid, and up to about 35% by weight methyl acrylate, said polymer having weight average molecular weight from about 200,000 to about 500,000 and a glass transition temperature less than about −15° C.

19. A pressure-sensitive adhesive as claimed in claim 18 in which the formed copolymer is cross-linked by exposure to heat, ionic additive, actinic radiation or electron beam radiation.

* * * * *

UNITED STATES PATENT AND TRADEMARK OFFICE
CERTIFICATE OF CORRECTION

PATENT NO. : 4,812,541
DATED : March 14, 1989
INVENTOR(S) : P. Mallya; C. Smith; S. S. Plamthottam It is certified that error appears in the above-identified patent and that said Letters Patent is hereby corrected as shown below:

In the Specification:

Column 4, line 24, change "to" to -- as --.
Column 4, line 61, after "force" insert -- is --.

Column 5, line 29, change "Isooctyl" to -- isooctyl --.
Column 5, line 33, change "reflex" to -- reflux --.

Column 6, line 30, change "CONTROL" to -- CONTROLS --.

In the Claims

Column 8, line 32, change "frm" to -- from --.

Signed and Sealed this

Twenty-fourth Day of April, 1990

Attest:

HARRY F. MANBECK, JR.

Attesting Officer

Commissioner of Patents and Trademarks